Aug. 26, 1958 A. J. TOBIAS 2,848,749
STRIATED PLASTIC
Filed May 22, 1957 2 Sheets-Sheet 1
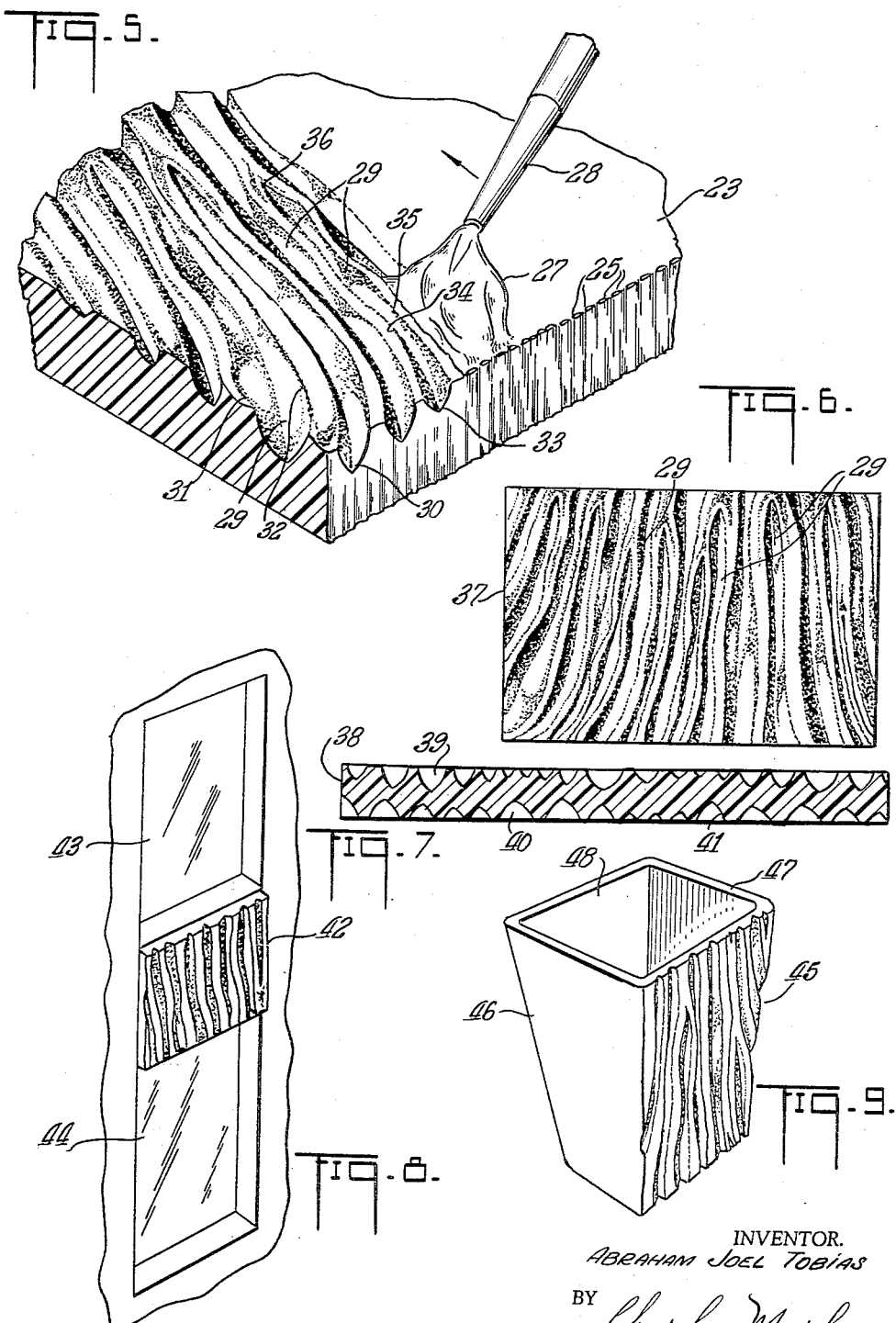
INVENTOR.
ABRAHAM JOEL TOBIAS
BY Charles Marks
ATTORNEY Aug. 26, 1958  A. J. TOBIAS  2,848,749
STRIATED PLASTIC
Filed May 22, 1957  2 Sheets-Sheet 2

INVENTOR.
ABRAHAM JOEL TOBIAS
BY Charles Marks
ATTORNEY

United States Patent Office 2,848,749
Patented Aug. 26, 1958

2,848,749

STRIATED PLASTIC

Abraham Joel Tobias, Rego Park, N. Y.

Application May 22, 1957, Serial No. 660,825

7 Claims. (Cl. 18—48.8)

This invention relates generally to striated thermoplastic materials and specially to striated thermoplastic sheets of methyl methacrylate.

As is well known, methyl methacrylate is commonly available, in a wide range of thicknesses, as cast sheets having smooth surfaces. While these surfaces are suitable for many purposes, it has been found desirable to impart a striated surface to such sheets, thereby producing a pleasing and ornamental appearance.

It is an object of the present invention to provide a thermoplastic sheet of methyl methacrylate with a striated surface formed upon selected portions thereof.

Another object of this invention is to provide an improved method for forming such a striated surface upon a thermoplastic sheet composed of said material.

A further object of the invention is to provide an improved method for forming such a striated surface in a manner which does not require the use of cumbersome or expensive equipment.

Other and more specific objects of the present invention will be apparent from the following description as read in connection with the accompanying drawings.

In the drawings:

Fig. 5 is a fragmentary perspective view illustrating the application of heat to the surface of the thermoplastic sheet.

Fig. 6 is a plan view of the striated surface of a thermoplastic sheet formed by the method of the invention;

Fig. 7 is a typical cross-sectional view of a thermoplastic sheet wherein both top and bottom surfaces have been striated in accordance with the method of the invention;

Figs. 8 and 9 illustrate applications of the ornamental sheet formed by the method of the invention.

Similar reference numerals indicate corresponding parts throughout the several views.

Figure 1:
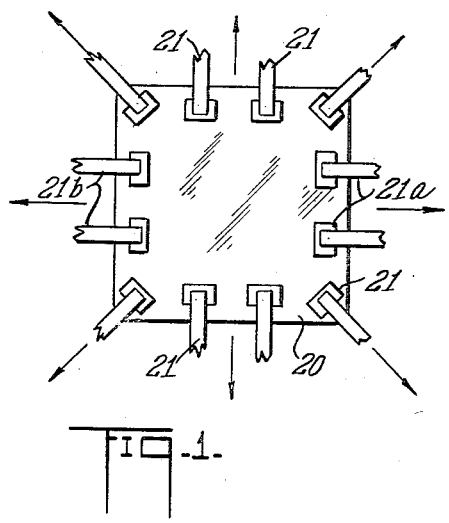
Fig. 1 is a plan view of a cast thermoplastic methyl methacrylate sheet engaged by a plurality of clamps.

As illustrated in the accompanying drawings, one embodiment of the process employed in the production of the aforesaid striated plastic is as follows:

A cast sheet 20, composed substantially of methyl methacrylate, is engaged by a plurality of clamps 21 which also subject said sheet to tensile forces in the direction of the arrows shown in Fig. 1. In practice, it has been found that sheets having a thickness in the range of ¾ to 1 inch are most satisfactory for purposes of the invention, although greater thicknesses may be employed if desired.

The sheet 20 is heated to a temperature range wherein it is substantially pliable, the temperature, however, being kept below the temperature of flammability. In this temperature range the sheet is easily deformed, as by stretching, but will retain its "elastic memory" when so deformed. As is well known in the art, the phenomenon called "elastic memory" refers to that tendency of deformed plastic materials to return to their original shape when subjected to heat.

Figure 2:
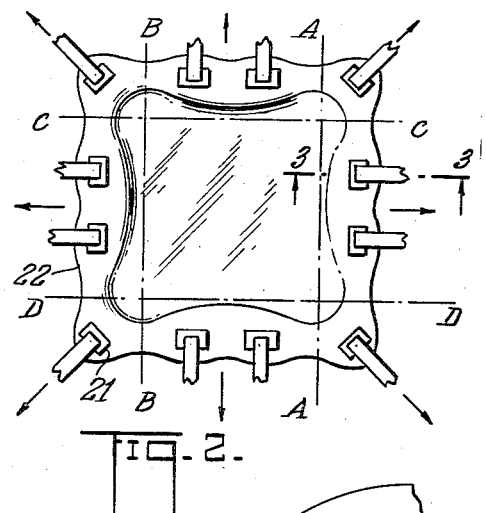
Fig. 2 is a plan view of said sheet after it has been subjected to deformation by the clamps.

In the present instance, the sheet 20 may be heated to the said temperature range either before, during or after engagement by the said clamps 21 and after said engagement it is stretched to the deformed condition illustrated by the sheet 22 in Fig. 2. In this deformed condition the clamps 21 remain engaged with said sheet 22 and continue to subject it to the same tension in the direction of the arrows indicated in this figure, thereby counteracting the effect of the aforesaid elastic memory.

Figure 3:
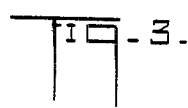
Fig. 3 is a cross-sectional view taken about the line 3—3 in Fig. 2.

Fig. 3 illustrates a cross-section of a portion of the deformed sheet 22 showing the engagement of one of the clamps 21 and the reduction in cross-sectional area, as at 23, of the deformed sheet 22.

While Figs. 1 and 2 illustrate the application of a plurality of radial tensile forces to the sheet in question, it is to be understood that said tensile forces may be exerted in any desired direction and need not be in the radial pattern shown in said figures. Thus, if desired, the sheet may be stretched by forces acting only in two opposite directions, such as those imposed by clamps 21a, 21b in Fig. 1. Since the striations produced by the process herein will lie in the direction of the tensile forces imposed on the said sheet, a variation of the direction of the said forces will accomplish a corresponding variation in the direction of the resulting striations. Thus radial tensile forces will produce substantially radial striations; and tension produced by forces acting in opposing directions, as induced by clamps 21a, 21b, will produce substantially parallel striations.

After inducing deformation, as illustrated, for example, in Fig. 2, the sheet is permitted to cool in this deformed position to a temperature at which it will acquire a set and will not revert to its original shape. In practice, it has been found convenient to permit this cooling to ordinary room temperature, as for example, to the range of 50 to 75 degrees F.

Figure 4:
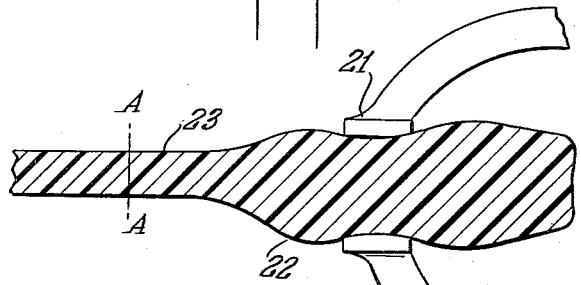
Fig. 4 is a fragmentary perspective view illustrating the severance of a portion of the aforesaid deformed sheet.
Figure 4:
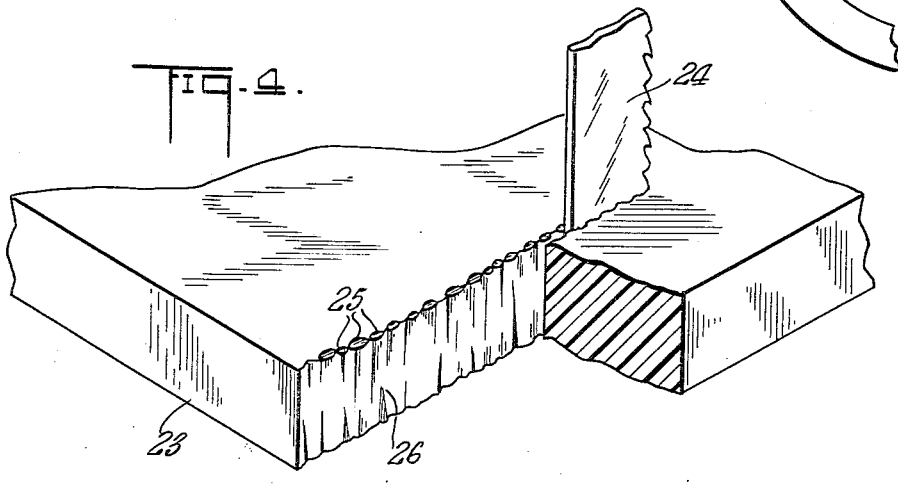

Sheet 22 is then severed, as along the imaginary lines A—A, B—B, C—C and D—D of Fig. 2, thereby producing a flat sheet of uniform thickness. The method of accomplishing this severance is extremely important to this process. Thus, as shown in Fig. 4, it has been found desirable in practice to accomplish severance by sawing the sheet 23 with a band saw 24. As seen in this figure, which is enlarged for purposes of clarity, a plurality of minute indentations 25 are formed along the severed edge of sheet 23 as a result of the sawing action of the band saw 24. Approximately vertical saw tooth marks 26 are also produced upon the face of the sheet formed by the action of the band saw.

Upon completion of the said sawing operation, a source of heat, such as that produced by a non-carbon-depositing flame 27 from an oxy-hydrogen torch 28, is placed in the vicinity of a severed edge of sheet 23, which edge is transverse to the direction of the tensile forces applied in initially deforming said sheet, as described above. At this time a plurality of striations 29 will form upon the surface exposed to the said source of heat. These striations will commence at the said indentations 25 and may be extended to areas of said sheet 23 away from the immediate vicinity of said severed edge by moving the said source of heat in the direction of the arrow in Fig. 5 and at an approximately constant elevation above the surface of the sheet to any point directly below which it is desired to extend said striation. Thus, the heat is continuously applied to the surface of the sheet, thereby maintaining the continuity of said striation; and said heat should be maintained at any one point of the sheet only as long as is required to form the desired striation. It is to be noted that the striations will be formed in the direction of the stresses, as described above; and that the depth and width of said striations will vary with the length of time they are exposed to said source of heat. Thus, the striations will tend to be deeper, as at 30 and wider, as from 31 to 32, when the source of heat is retained in the vicinity of said striations for a relatively long time as contrasted with the time of its retention in the vicinity of a striation such as that having a relatively shallow depth 33 and narrow width, as from 34 to 35. It should also be noted that the striations will terminate in a pointed end portion, as at 36 and will have an approximately cusp-like cross-section.

A typical surface produced upon a sheet 37 of methyl methacrylate is illustrated in Fig. 6, wherein a plurality of striations 29 are indicated.

Fig. 7 illustrates such a sheet 38 in which the source of heat has been applied in the above described manner to both the top and bottom surfaces 39, 40 thereof. Here may best be seen the approximately cusp-like cross-section of the striations, as indicated in the case of striation 41.

It is evident from the foregoing that the striated sheet produced by the aforesaid process may be used in a wide variety of applications. Figs. 8 and 9 illustrate only two of these applications. Thus, Fig. 8 shows the application of a striated sheet 42 as a spandrel located upon the exterior of a building between two windows 43, 44. Fig. 9 illustrates the use of a striated sheet 45 in conjunction with non-striated sheets 46, 47, 48 to form an ornamental basket. Many other applications are readily apparent.

Suitable fillers and pigments may be employed in said striatable sheets, as desired.

It is also to be noted that while the above mentioned oxy-hydrogen flame does not deposit carbon upon the striated surfaces, carbon-depositing flames such as an oxy-acetylene flame may be employed where it is desired to incorporate deposits of carbon upon such surfaces.

Moreover, the said process may be employed to form striated surfaces upon acrylates and acrylate polymers having physical characteristics similar to those described above in reference to methyl methacrylate.

The embodiments of the invention illustrated and described hereinabove have been selected for the purpose of clearly setting forth the principles involved. It will be apparent, however, that the present invention is susceptible to being modified in respect to details of construction, combination and procedure which may be resorted to without departure from the spirit and scope of the invention as claimed.

I claim:

1. The process for forming a striated surface upon a cast sheet composed substantially of methyl methacrylate comprising the steps of stretching a heated sheet of said material, permitting it to cool while subjected to said stretching, whereby said sheet assumes a permanent set in its stretched condition, band sawing a portion of said sheet, whereby a plurality of indentations are formed on at least one edge of said sheet, applying a source of heat to said edge and then moving said source of heat from said edge into the vicinity of areas of said sheet adjoining said edge, said source of heat being continuously applied to said sheet while being so moved, whereby a plurality of striations are formed commencing at said indentations and extending into said adjoining areas, said striations extending in the direction of said stretching, the thickness of said sheet being greater than the depth of said striations.

2. The process according to claim 1, the said stretching of said heated sheet occurring when it is exposed to a temperature sufficient to render said sheet in a substantially pliable condition, said temperature being below the temperature of flammability of said methyl methacrylate sheet.

3. The process according to claim 1, the said source of heat being an oxy-hydrogen flame.

4. The process according to claim 1, the said source of heat being concentrated at pre-selected areas of said sheet, whereby the width and depth of said striations are increased at said pre-selected areas.

5. The process according to claim 1, the said stretching being in at least two opposite directions.

6. The process according to claim 1, the said stretching being in a plurality of radial directions.

7. The process according to claim 1, said source of heat being applied to the upper and lower parallel surfaces of said sheet adjacent to said edge, whereby said striations are formed upon said upper and lower surfaces.

References Cited in the file of this patent

UNITED STATES PATENTS

| | | |
|---|---|---|
| 2,054,848 | Bowker | Sept. 22, 1936 |
| 2,578,743 | Rosenthal | Dec. 18, 1951 |
| 2,659,105 | Halbig et al. | Nov. 17, 1953 |